(12) United States Patent
Uchimi

(10) Patent No.: US 9,651,824 B2
(45) Date of Patent: May 16, 2017

(54) IMAGE DISPLAY APPARATUS

(71) Applicant: CANON KABUSHIKI KAISHA, Tokyo (JP)

(72) Inventor: Tasuku Uchimi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/731,988

(22) Filed: Jun. 5, 2015

(65) Prior Publication Data
US 2015/0355504 A1    Dec. 10, 2015

(30) Foreign Application Priority Data

Jun. 10, 2014 (JP) ................................. 2014-119847

(51) Int. Cl.
*G02F 1/1335* (2006.01)
*G02F 1/1333* (2006.01)

(52) U.S. Cl.
CPC .. *G02F 1/133608* (2013.01); *G02F 1/133308* (2013.01); *G02F 2001/13332* (2013.01); *G02F 2001/133317* (2013.01); *G02F 2001/133322* (2013.01)

(58) Field of Classification Search
CPC ......... G02F 1/133308; G02F 1/133615; G02F 1/1335; G02F 1/1345; G02F 1/133608; G02F 1/133606; G02F 1/133602; G02F 1/133611; G02F 1/13338; G02F 1/1333; G02F 1/133504; G02F 2001/133317; G02F 2001/133314; G02F 2001/13332; G02F 2001/133325; G02F 2001/133322; G02F 2001/133328; G02F 2201/46; G02F 2201/465; G02F 2201/50; G02B 6/0073; G02B 6/0051; G02B 6/0053; H04N 5/64; H04N 5/645; B60K 2350/1028; G06F 1/1601; G06F 1/1616; G06F 1/1637; H05K 1/028; H05K 2201/10136;
(Continued)

(56) References Cited

U.S. PATENT DOCUMENTS 8,587,746 B2 * 11/2013 Kim ..................... G02B 6/0088
349/61
9,277,667 B2 * 3/2016 Fujii ......................... G09F 9/30
(Continued)

FOREIGN PATENT DOCUMENTS

JP    2012-032565 A    2/2012
JP    2012-034289 A    2/2012
(Continued)

*Primary Examiner* — Thoi Duong
(74) *Attorney, Agent, or Firm* — Cowan, Liebowitz & Latman, P.C.

(57) ABSTRACT

Provided is an image display apparatus, including: a display panel; a light emitting unit that emits light to be irradiated onto the display panel; an optical sheet that is disposed between the light emitting unit and the display panel; a first holding unit that holds the display panel; and a second holding unit that holds the optical sheet, wherein the first holding unit and the second holding unit are separate members. The first holding unit includes: a transparent front plate that is fixed onto the display surface; and a frame that holds the front plate from the rear surface side, and the display panel fixed onto the front plate is held by the front plate that is held by the frame.

7 Claims, 19 Drawing Sheets

(58) Field of Classification Search
CPC .......... H05K 2201/10106; H05K 7/02; H05K 5/0004; H05K 5/0217
USPC .... 349/58, 65, 62, 12, 64, 150, 60, 67, 122; 362/97.1, 611, 613, 634, 608, 615, 97.2, 362/97.3, 330, 609, 612, 631; 348/794, 348/790, E5.128, 836; 361/748, 809
See application file for complete search history.

(56) References Cited

U.S. PATENT DOCUMENTS

| | | | | |
|---|---|---|---|---|
| 2008/0297685 | A1* | 12/2008 | Sugibayashi | G02F 1/1333 349/58 |
| 2010/0231821 | A1* | 9/2010 | Tsuji | G02F 1/133308 349/58 |
| 2014/0362328 | A1* | 12/2014 | Kuroki | G02F 1/133308 349/58 |
| 2016/0004119 | A1* | 1/2016 | Yoshikawa | G02F 1/133606 349/112 |

FOREIGN PATENT DOCUMENTS

| | | | | |
|---|---|---|---|---|
| JP | 2012-088606 A | 5/2012 | | |
| JP | WO 2013/157038 | * 10/2013 | ........... | G02F 1/1333 |

* cited by examiner

IMAGE DISPLAY APPARATUS

BACKGROUND OF THE INVENTION

Field of the Invention

The present invention relates to an image display apparatus.

Description of the Related Art

An image display apparatus is basically constituted by a surface light source apparatus (backlight apparatus), a display panel (e.g. liquid crystal panel), a structure to support these components, an electric circuit unit, and an exterior member. Some image display apparatuses for business use have a transparent front plate that is mounted on the display surface of the display panel, and is used to protect the image display apparatus from external impact and soaking due to rainfall. In order to suppress a drop in visibility of a displayed image caused by attached the front plate, an image display apparatus proposed in Japanese Patent Application Laid-Open No. 2012-88606 has a structure where a transparent adhesive is disposed in a gap between the display panel and the front plate. An image display apparatus proposed in Japanese Patent Application Laid-Open No. 2012-34289 has a structure where the front plate is supported by a housing of the image display apparatus.

FIG. 17 is a cross-sectional view depicting a key section of the image display apparatus disclosed in Japanese Patent Application Laid-Open No. 2012-34289. A display panel 103A and a front plate 101 are disposed on the display surface side of an image display apparatus 100, and the display panel 103A and the front plate 101 are bonded with transparent adhesive (not illustrated). A light source 103C, a middle chassis 107, an optical sheet 103B and a light guiding plate 103D are disposed on the opposite side of the display surface of the display panel 103. The middle chassis 107 is disposed along the periphery of the display panel 103A to fix the optical sheet 103B.

The light source 103C, the optical sheet 103B and the light guiding plate 103D are housed by a back chassis 108. A mounting frame 102 is bonded on the periphery of the front plate 101 by a double-sided tape (not illustrated). A mounting member 110 is disposed to fix the back chassis 108 and the mounting frame 102. The display panel 103A is held by the front plate 101 that is supported by the mounting member 110.

SUMMARY OF THE INVENTION

The middle chassis 107 disposed on the backlight side of the display panel 103A plays a role of supporting the display panel 103A from the rear face side, and a role of pressing an optical sheet group 103B. Therefore the middle chassis 107 has a complicated shape, which is preferably molded by resin molding using plastic as a material. But if a component is created by resin molding, warpage or the like tends to be easily generated. Further, in the case of a large type image display apparatus, the middle chassis 107 also becomes large, and a die used for the resin molding becomes large, which increases cost for component molding.

With the foregoing in view, it is an object of the present invention to reduce cost by simplifying the component shape of the image display apparatus.

The present invention is an image display apparatus that includes: a display panel; a light emitting unit that emits light to be irradiated onto the display panel; an optical sheet that is disposed between the light emitting unit and the display panel; a first holding unit that holds the display panel; and a second holding unit that holds the optical sheet, and the first holding unit and the second holding unit are separate members.

According to the present invention, cost can be reduced by simplifying the component shape of the image display apparatus.

Further features of the present invention will become apparent from the following description of exemplary embodiments with reference to the attached drawings.

DESCRIPTION OF THE EMBODIMENTS

Example 1

Example 1 of the present invention will now be described.

Figure 1:
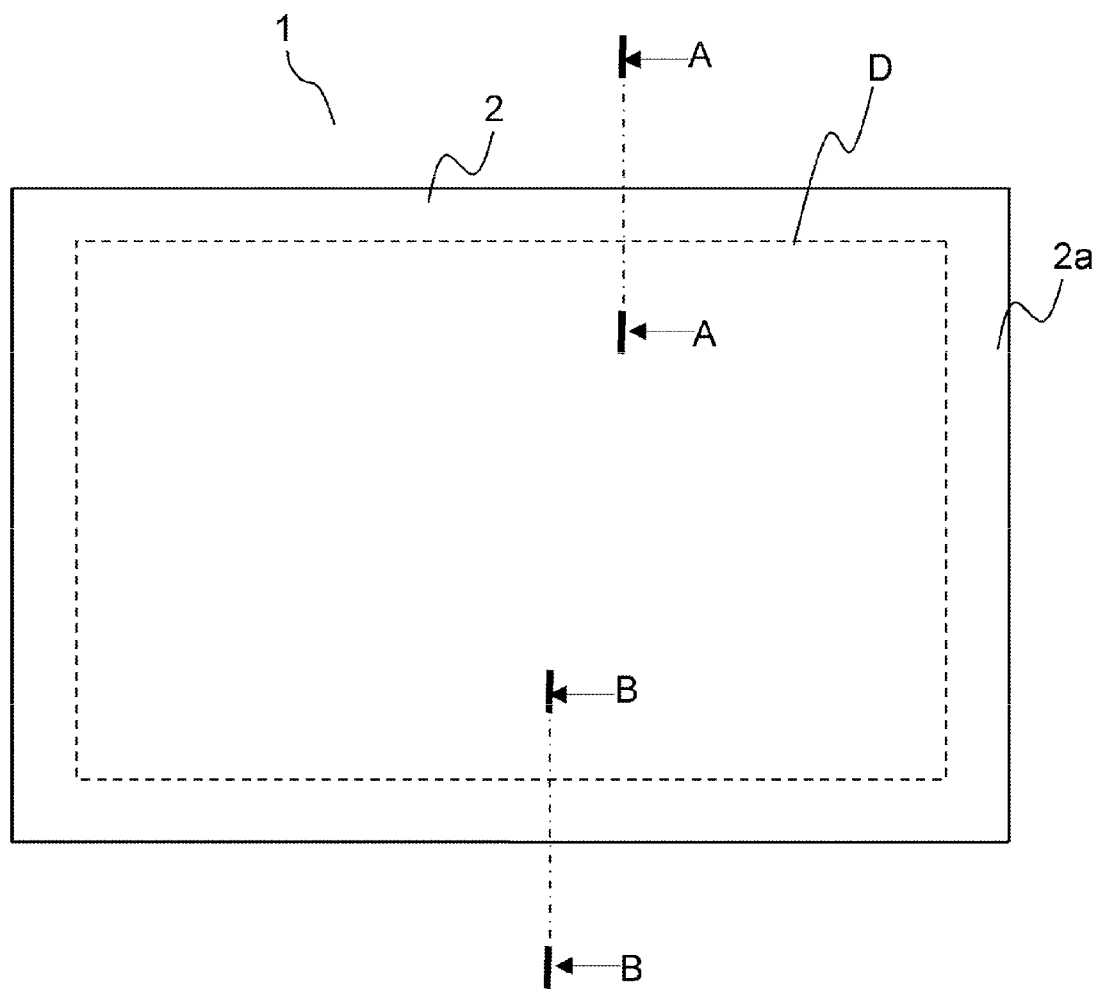
FIG. 1 is a front view of an image display apparatus of Example 1.
Figure 2:
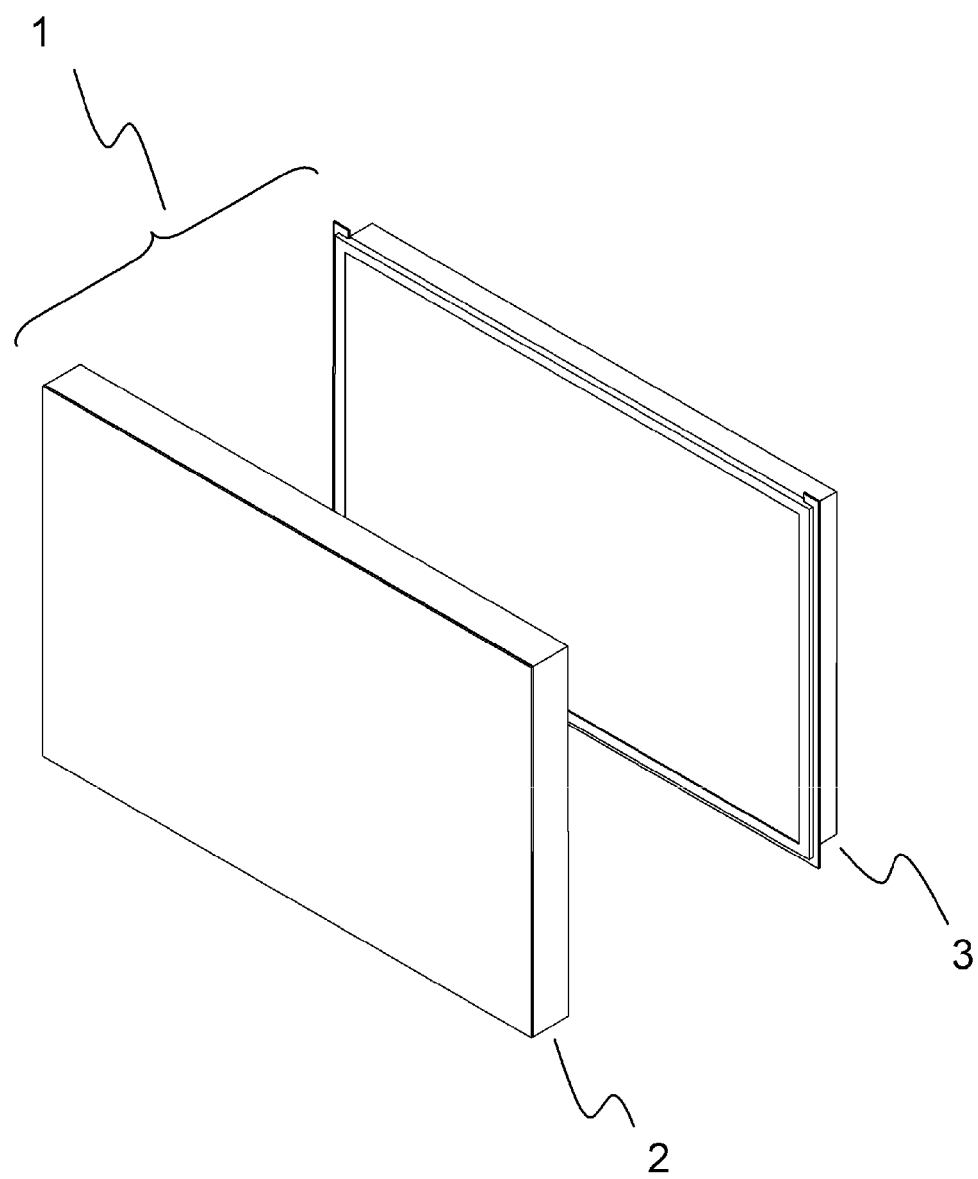
FIG. 2 is an exploded perspective view of a panel unit and a backlight unit of Example 1.

FIG. 1 is a front view of an image display apparatus of Example 1 of the present invention. FIG. 2 is an exploded perspective view of a display panel unit and a backlight unit of the image display apparatus of Example 1 of the present invention.

The image display apparatus 1 has a configuration where the entire display panel unit 2 can be seen when viewed from the front, and an image display area D, where an image is displayed, exists approximately at the center of the display panel unit 2. The image display area D is an image display area of a display panel which is described later. A light shielding print area 2a (on the rear surface of the display panel unit 2) is disposed on the outside of the image display area D. In the display panel unit 2, a blue plate glass or a tempered glass is disposed as a later mentioned front plate, and the front plate transmits an image of a liquid crystal panel located inside. An observer can view an image displayed on the liquid crystal panel via the front plate. The light shielding print area 2a is disposed in a range of the display panel unit 2 outside the image display area D, so that inside the display panel unit 2 is not seen, since the front plate is made of glass. By creating the light shielding print area 2a, design becomes aesthetic and appearance improves.

FIG. 2 depicts the structure of the image display apparatus 1 in detail. The image display apparatus 1 can be divided into the display panel unit 2 and the backlight unit 3 in order from the front surface side. The display panel unit 2 is a coupling component including a device to display an image, and the backlight unit 3 is a surface light source apparatus (light emitting apparatus) that irradiates light onto the display panel unit 2 from the opposite side of the image display surface of the display panel unit 2.

Figure 3:
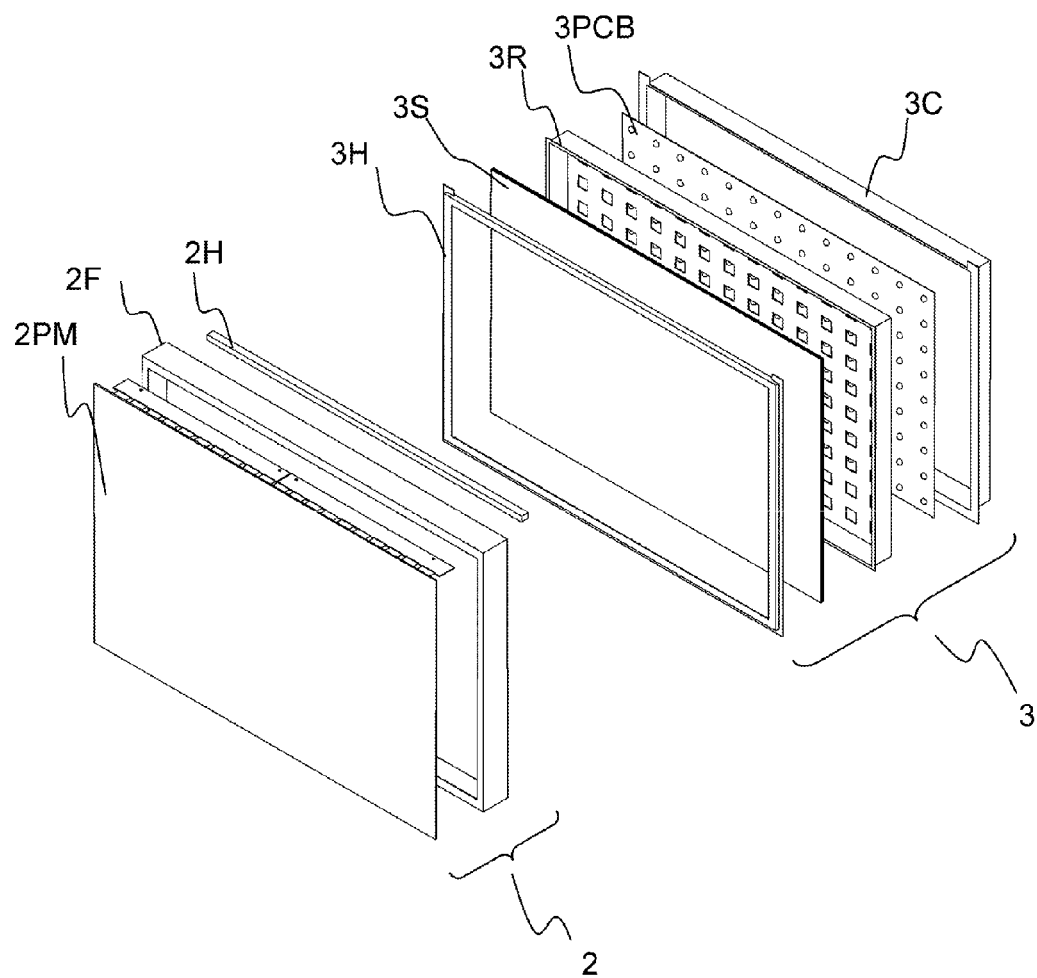
FIG. 3 is an expanded perspective view of the image display apparatus of Example 1.

FIG. 3 is a more detailed exploded perspective view of the image display apparatus of Example 1 of the present invention.

The image display apparatus 1 has, in order from the front surface side, the display panel unit 2 and the backlight unit 3. The display panel unit 2 is constituted by a display panel module 2PM, a frame 2F and a heat sink 2H. The backlight unit 3 is constituted by a sheet holder 3H, an optical sheet 3S, a reflection sheet 3R, a light source board 3PCB and a case 3C.

The frame 2F for holding the display panel module 2PM is bonded and fixed on the rear surface of the display panel module 2PM. The heat sink 2H is disposed on the rear surface of the upper area of the frame 2F.

The configuration of the backlight unit 3 will be described. The sheet holder 3H is disposed on the forefront side of the backlight unit 3. The sheet holder 3H is created by pressing or cutting a sheet member. The sheet holder 3H is a member to hold the optical sheet 3S located on the rear surface side. The optical sheet 3S is a sheet type component made from polyethylene terephthalate (PET) or polycarbonate (PC) with a several hundred μm thickness. The optical sheet 3S is easily deflected and is held by the sheet holder 3H.

The reflection sheet 3R is disposed on the rear surface side of the optical sheet 3S. The light source board 3PCB and the case 3C are disposed on the rear surface side thereof. The case 3C houses the light source board 3PCB and the reflection sheet 3R.

Figure 4:
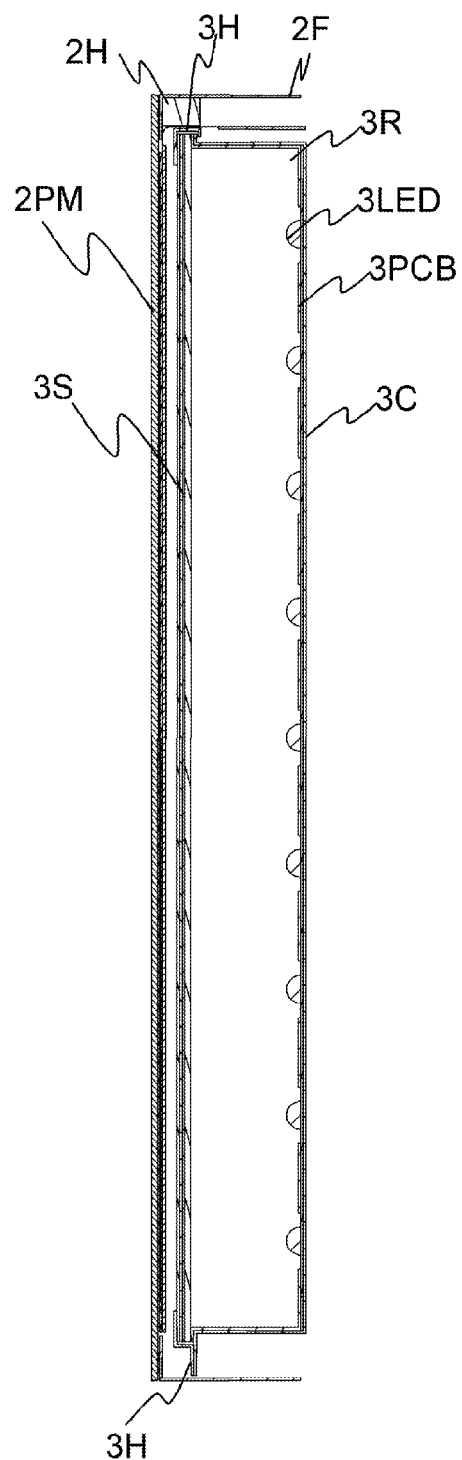
FIG. 4 is a cross-sectional view of the image display apparatus of Example 1.

FIG. 4 is a cross-sectional view of the image display apparatus of Example 1 of the present invention.

A plurality of light sources 3LED are mounted on the light source board 3PCB. The light source 3LED is a light emitting element, such as a light emitting diode (hereafter called "LED"), and a plurality of light sources 3LED are disposed. Thereby the backlight unit 3 functions as a surface light source apparatus. The light source 3LED may be a white LED or an R, G or B LED having independent red, green or blue color in order to expand the display color gamut. The light source is not limited to an LED, but may be a cold cathode fluorescent lamp (CCFL). The light emitted from the light source 3LED is irradiated onto the optical sheet 3S, transmits through the display panel module 2PM and forms an image. The optical sheet 3S is normally constituted by a thick diffusion plate, a diffusion sheet to diffuse light, a lens sheet to collect light, and a polarized reflection sheet to polarize and reflect light. The light emitted from the light source 3LED is reflected by the reflection sheet 3R and is irradiated onto the optical sheet 3S.

Figure 5:
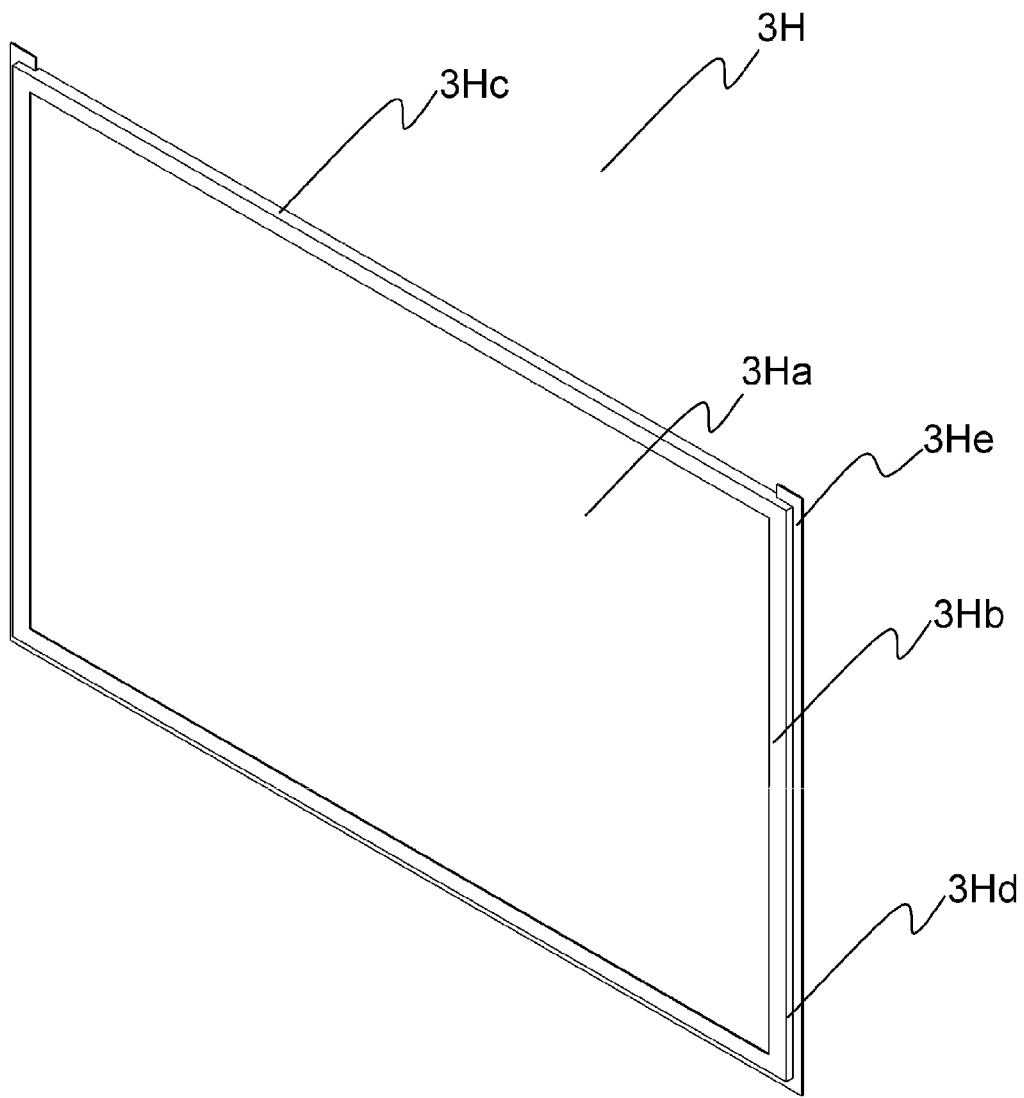
FIG. 5 is a perspective view of a sheet holder of Example 1.
Figure 6A:
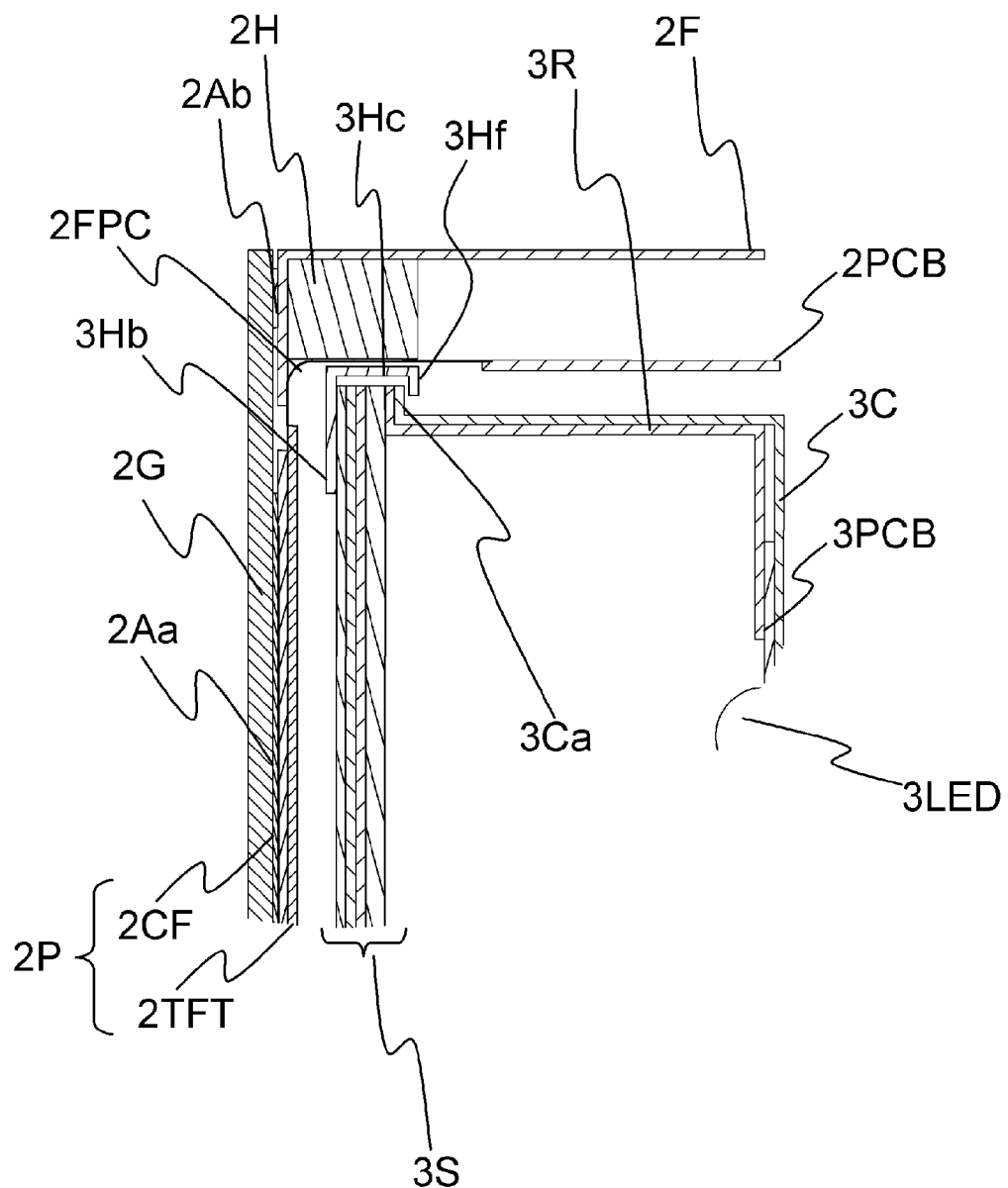
FIG. 6A is a cross-sectional view of the image display apparatus of Example 1 sectioned at A-A in FIG. 1.
Figure 6B:
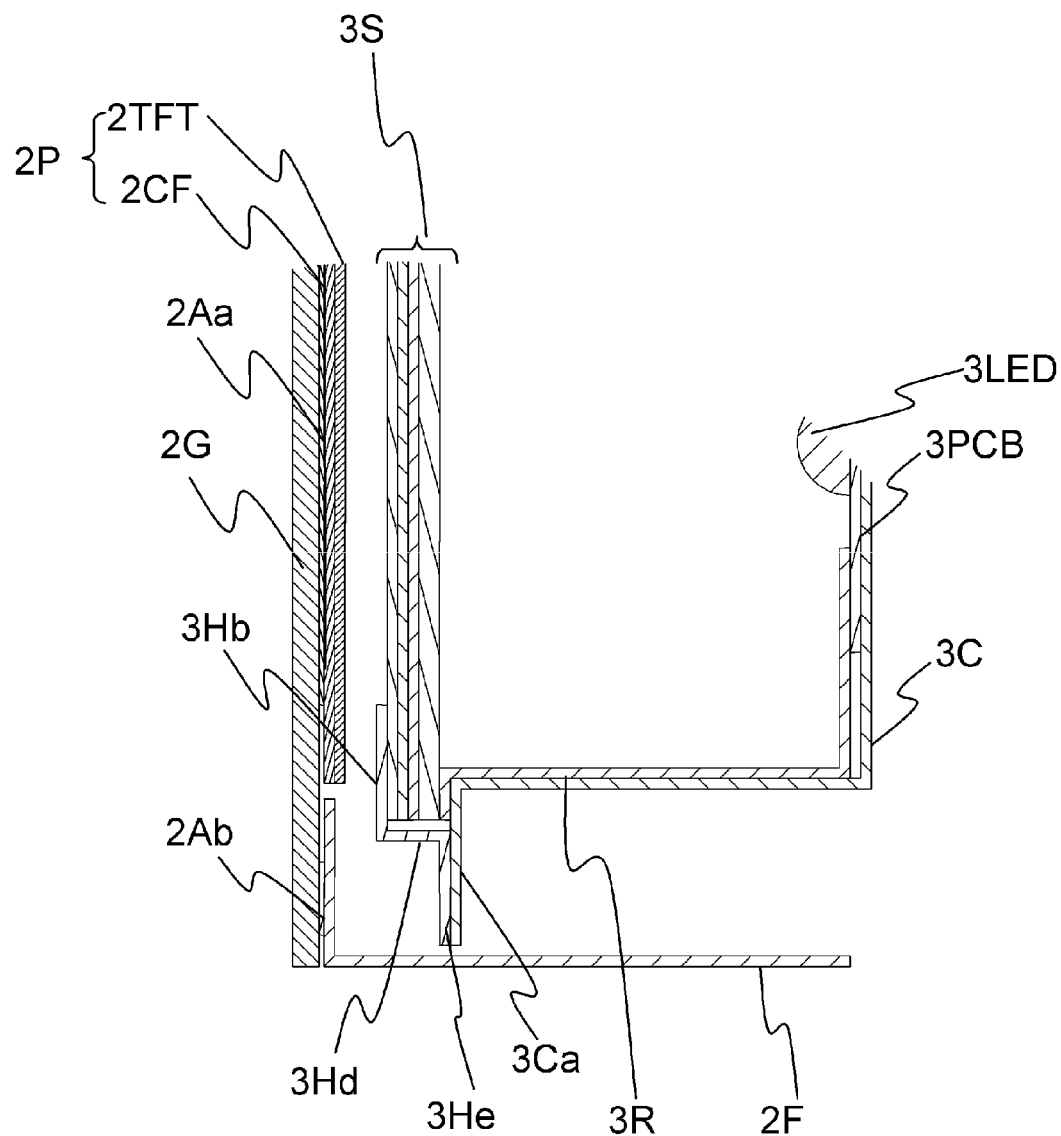
FIG. 6B is a cross-sectional view of the image display apparatus of Example 1 sectioned at B-B in FIG. 1.

FIG. 5 is a perspective view of the sheet holder 3H of Example 1 of the present invention. FIG. 6A is a cross-sectional view of an upper area of the image display apparatus sectioned at A-A in FIG. 1, and FIG. 6B is a cross-sectional view of a lower area of the image display apparatus sectioned at B-B in FIG. 1. The configuration and structure of the sheet holder 3H of the image display apparatus will be described with reference to these drawings.

The front plate 2G is made of blue-plate glass or tempered glass. The front plate 2G is bonded to the display panel 2P disposed on the rear surface side thereof by transparent adhesive 2Aa illustrated in FIG. 6A. The transparent adhesive 2Aa is an ultraviolet curing type resin that adheres to the surface of the display panel 2P, and is a constituent for fixing the front plate 2G. The transparent adhesive 2Aa is colorless and transparent, has about a 1.5 refractive index, and has optical characteristics close to glass material, so as to minimize the influence on display image quality.

The sheet holder 3H has an approximately square shape, and an opening 3Ha exists approximately at the center. The portion on the frame of the sheet holder 3H is a plane portion 3Hb having a plane shape, and a step portion 3Hd exists there around forming a step difference between the plane portion 3Hb and the later mentioned flange portion 3He. A flange portion 3He, that continues from the step portion 3Hd, exists on the outer periphery of the step portion 3Hd. A bent portion 3Hc, which is formed by bending the plane portion 3Hb, exists on the upper area of the sheet holder 3H.

The sheet holder 3H is created by processing a sheet member. For example, the sheet holder 3H is created by pressing or cutting a plate type member, such as PET or PC. This reduces cost compared with the resin molding that requires a die.

As illustrated in FIG. 6A, the display panel module 2PM is constituted by the front plate 2G, the display panel 2P, an electric cable 2FPC and a drive board 2PCB. In Example 1, the display panel 2P is a liquid crystal panel. The display panel 2P however is not limited to a liquid crystal panel, and the present invention can be applied to display panels in general, which display images by transmitting light from the backlight. The display panel 2P is constituted by a color filter substrate 2CF on the front surface side and a TFT substrate 2TFT on the rear surface side. The color filter substrate 2CF is a substrate having a configuration where an upper polarizing plate (not illustrated) is bonded to the viewing side surface of a glass substrate, and has a color filter on one side thereof. The TFT substrate 2TFT is a substrate having a configuration where a lower polarizing plate (not illustrated) is bonded to the surface opposite the viewing side of the glass substrate, and has an electric wiring on one side thereof. Liquid crystals are filled between the substrates that face each other, the periphery of the substrates is sealed, and the later mentioned electric cable 2FPC is connected to the terminal portion of the glass substrate, whereby the display panel 2P is completed.

The electric cable 2FPC is a flexible printed circuit (FPC) that electrically connects the terminal portion of the display panel 2P and the later mentioned drive board 2PCB, and an IC is mounted around the center of the electric cable 2FPC.

The drive board 2PCB is an electric circuit that supplies image signals and power to the display panel 2P, and is constituted by wires and elements.

The frame 2F is bonded to the rear surface side of the front plate 2G by a double sided tape 2Ab. The frame 2F is a member to hold the front plate 2G, and is created by processing (e.g. pressing) a metal plate, such as a steel plate.

The cross-section of the frame 2F is approximately L-shaped, and the heat sink 2H is disposed on the inner side of the bent portion. The heat sink 2H is disposed to radiate heat of the IC mounted on the electric cable 2FPC, and is disposed so as to contact the above mentioned IC.

The display panel 2P and the front plate 2G are fixed by the transparent adhesive 2Aa. In a conventional structure, such components as a resin-molded panel holder, are required to support the display panel, but these components are unnecessary in the case of Example 1, since the display panel 2P is fixed to the front plate 2G by the transparent adhesive 2Aa. The frame 2F and the front plate 2G constitute a first holding unit for holding the display panel 2P.

Falling of the optical sheet 3S toward the front surface side is prevented by the plane portion 3Hb of the sheet holder 3H. The weight of the optical sheet 3S is supported by the step portion 3Hd in the lower area of the sheet holder 3H. The upper area of the sheet holder 3H is hooked to the upper area of the case 3C by the latching portion 3Hf, which is a portion further bent from the bent portion 3Hc. The sheet holder 3H is fixed in the lower area by the case 3C and the flange portion 3He using such a method as screwing (not illustrated).

While a conventional structure requires a resin-molded panel holder to support the display panel and the optical sheet, Example 1 does not require the panel holder since the display panel 2P is fixed to the front plate 2G. Therefore instead of using the panel holder that has a complicated shape and must be molded with resin, in the structure of Example 1, the sheet holder 3H that has a simple shape to support only the optical sheet and can be created by processing the sheet member can be used. The sheet holder 3H constituted the second holding unit. As a result, the die for resin-molding the panel holder having a complicated shape is unnecessary, and cost can be reduced compared with the conventional structure.

Example 2

Example 2 of the present invention will now be described.

Figure 7:
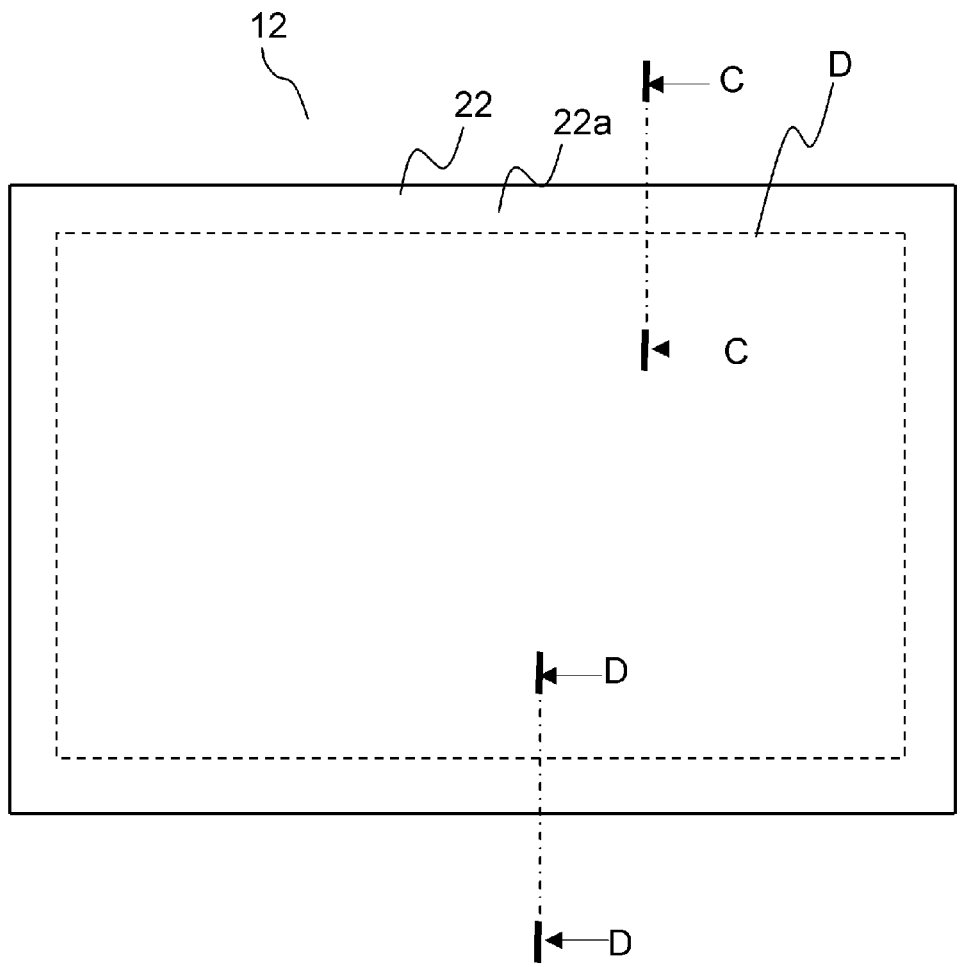
FIG. 7 is a front view of an image display apparatus of Example 2.
Figure 8:
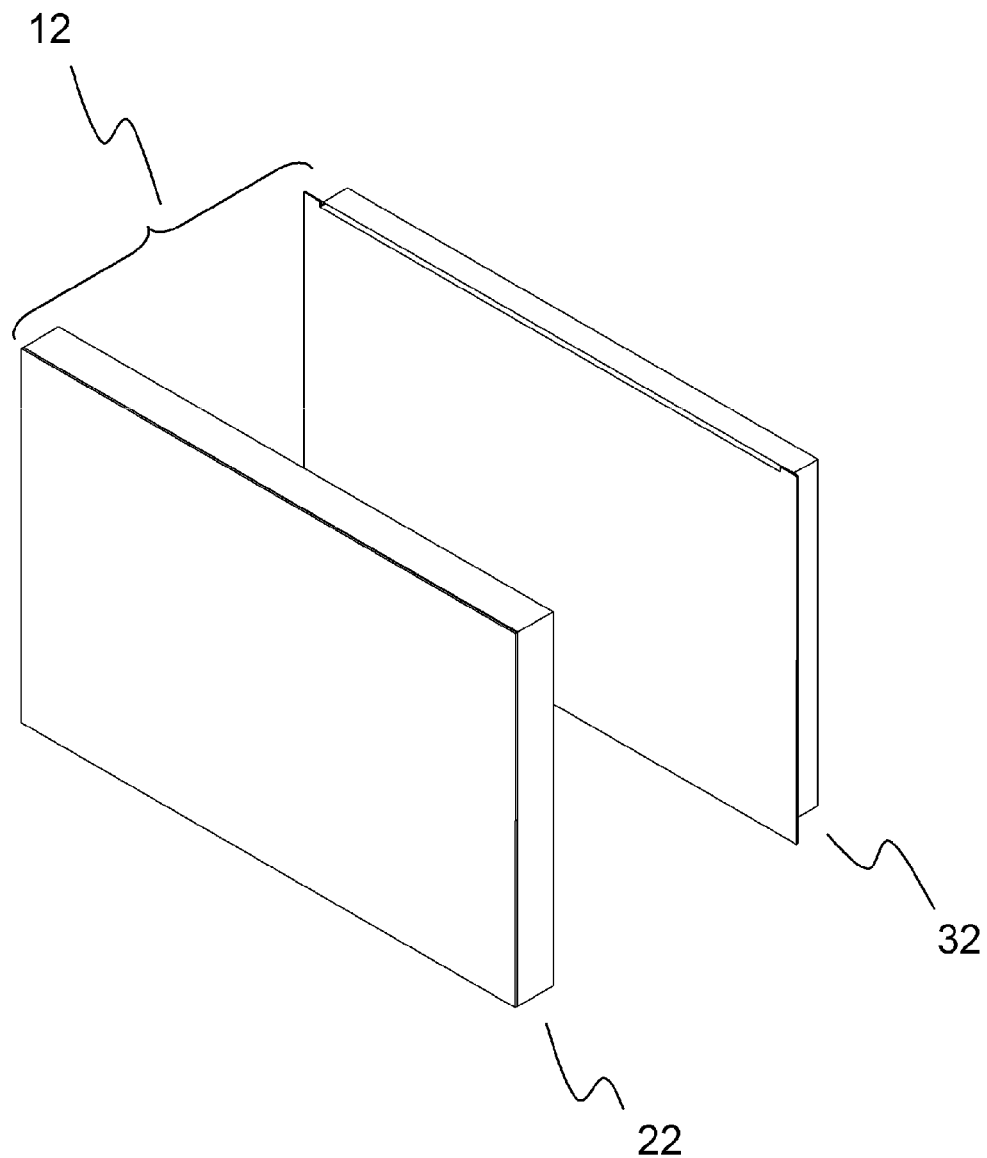
FIG. 8 is an exploded perspective view of a panel unit and a backlight unit of Example 2.

FIG. 7 is a front view of an image display apparatus of Example 2 of the present invention. FIG. 8 is an exploded perspective view of the image display apparatus of Example 2 of the present invention.

The image display apparatus 12 has a display panel unit 22 on the front surface, and a light shielding print area 22a is disposed on the periphery of the display panel unit 22 on the rear surface, just like Example 1. An image display area D is disposed on an approximately center portion of the display panel unit 22.

As illustrated in the exploded perspective view in FIG. 8, the image display apparatus 12 has a display panel unit 22 and a backlight unit 32. The backlight unit 32 is disposed on the rear surface of the display panel unit 22, just like Example 1.

Figure 9:
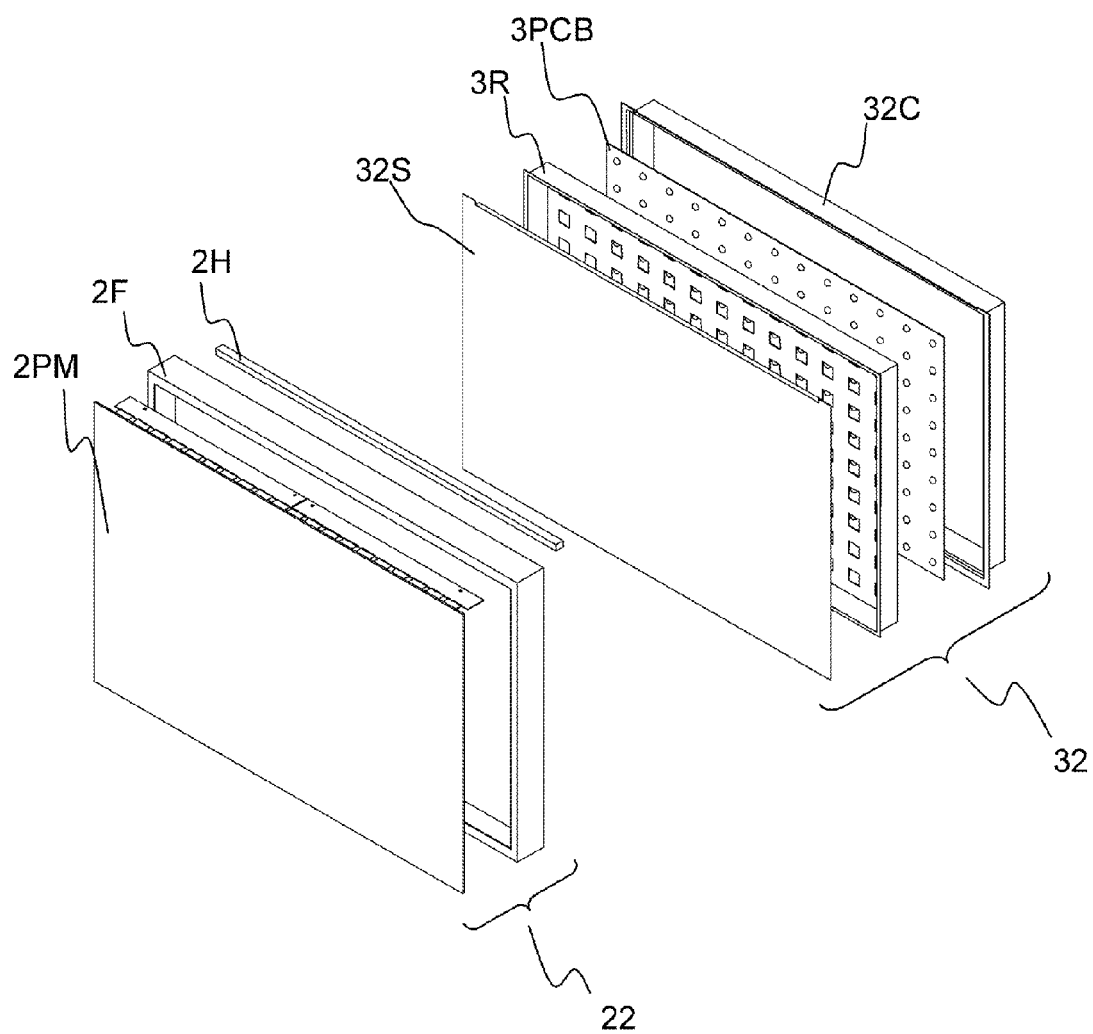
FIG. 9 is an exploded perspective view of the image display apparatus of Example 2.

FIG. 9 is an exploded perspective view of the display panel unit 22 and the backlight unit 32 constituting the image display apparatus of Example 2 of the present invention. The display panel unit 22 has a structure similar to the display panel unit 2 of Example 1. An optical sheet 32S and a reflection sheet 3R are disposed on the backlight unit 32 in order from the display panel unit 22 side. A light source board 3PCB is disposed on the rear surface side of the reflection sheet 3R. A case 32C is disposed so as to cover the reflection sheet 3R and the light source board 3PCB. The difference from Example 1 is that the sheet holder is not disposed on the front surface side of the optical sheet 32S.

The configuration of the optical sheet 32S will now be described.

Figure 10:
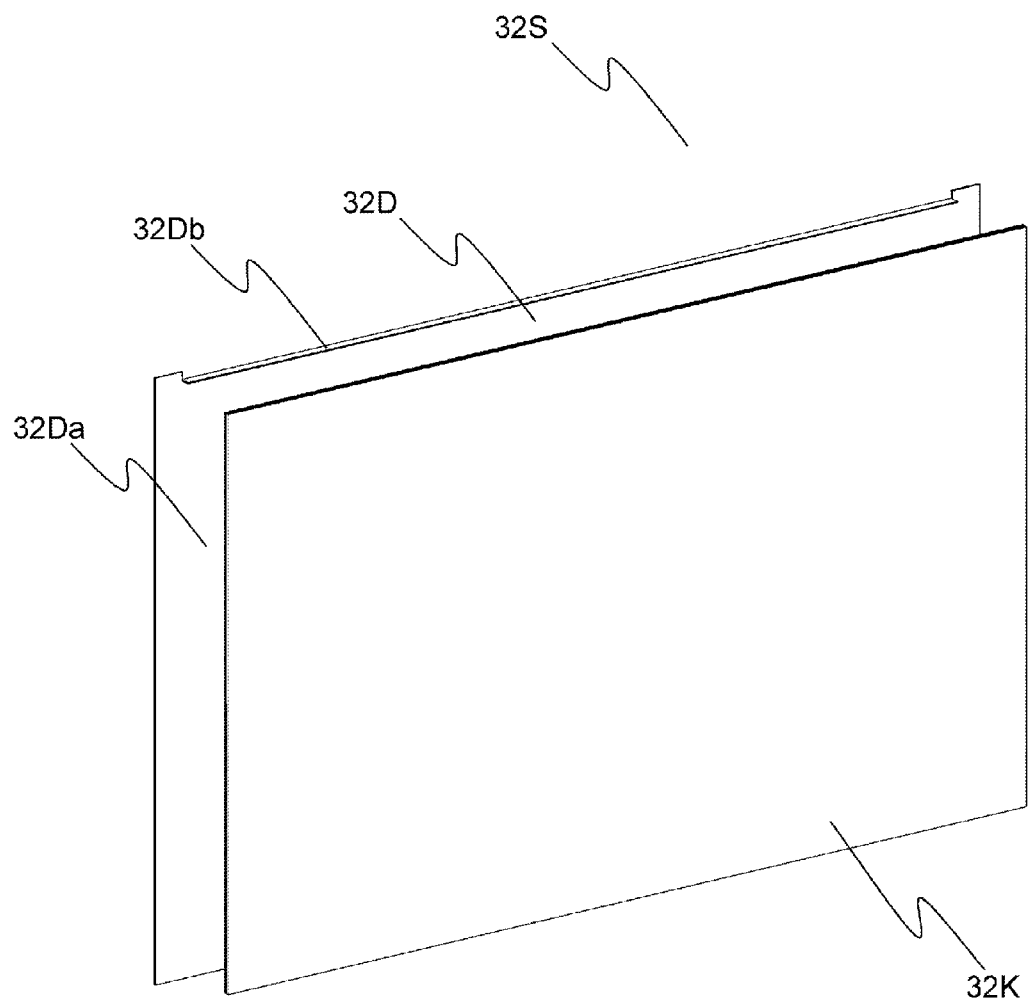
FIG. 10 is an exploded perspective view of an optical sheet group in Example 2.
Figure 11A:
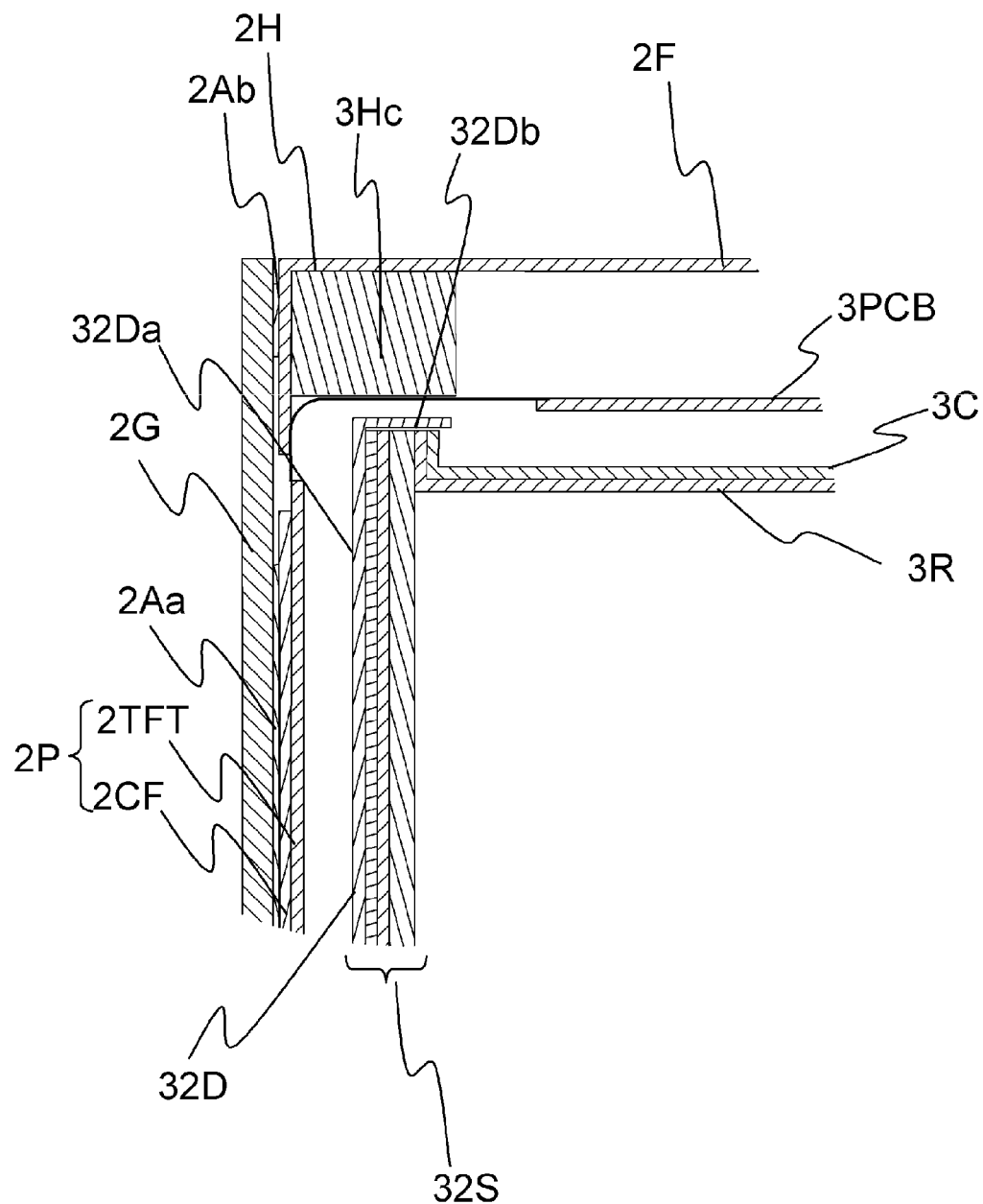
FIG. 11A is a cross-sectional view of the image display apparatus of Example 2 sectioned at C-C in FIG. 7.
Figure 11B:
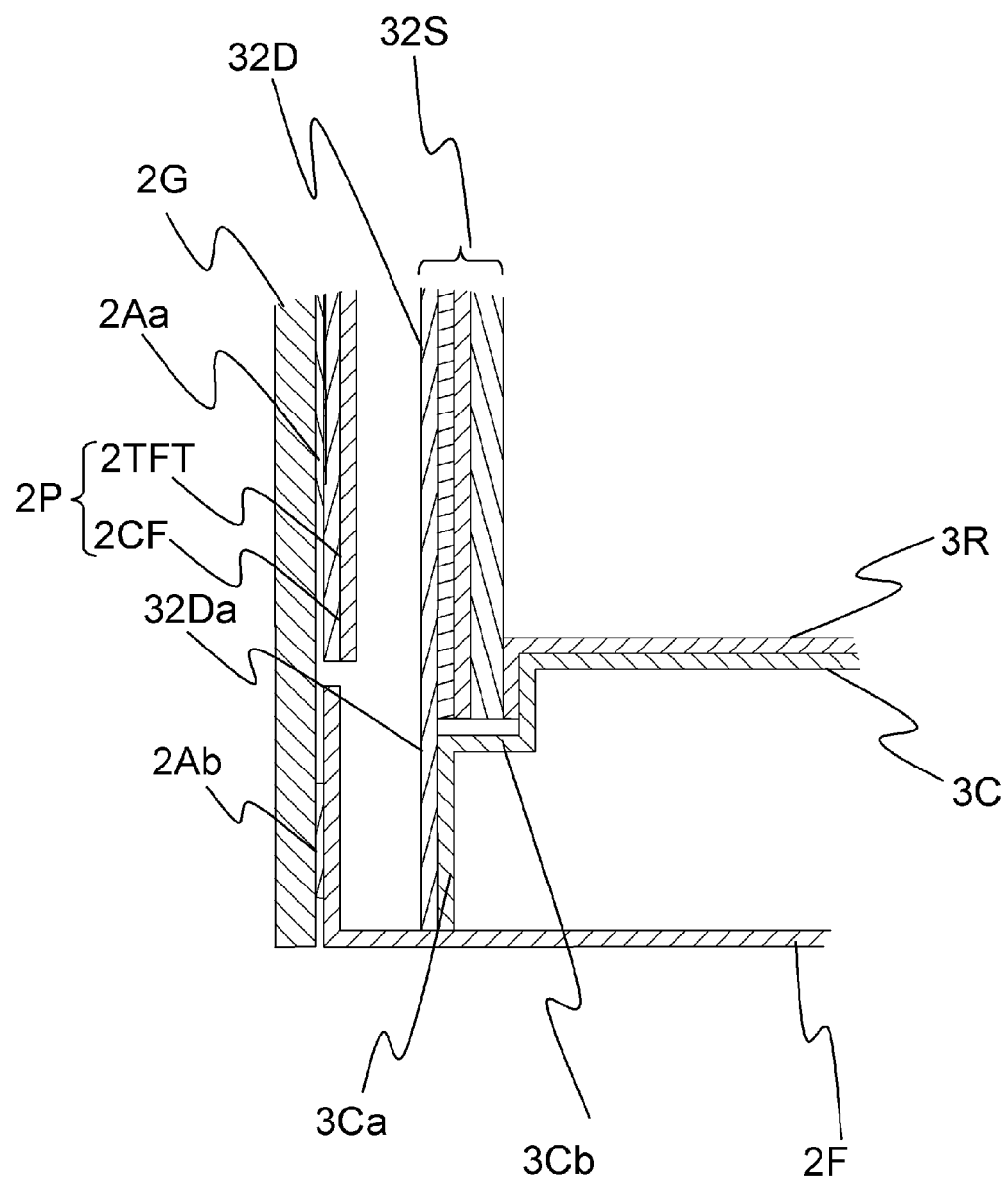
FIG. 11B is a cross-sectional view of the image display apparatus of Example 2 sectioned at D-D in FIG. 7.

FIG. 10 is an exploded perspective view of the optical sheet 32S of Example 2 of the present invention. FIG. 11A is a cross-sectional view sectioned at C-C in FIG. 7. FIG. 11B is a cross-sectional view sectioned at D-D in FIG. 7.

The optical sheet 32S is constituted by a diffusion plate group 32K and a forefront sheet 32D. The diffusion plate group 32K is constituted by a diffusion plate, a diffusion sheet and a lens sheet, which are disposed in order from the backlight side. The role of each component is the same as Example 1. The configuration of the diffusion plate group 32K is not limited to the above mentioned configuration only if the light from the backlight can be diffused or collected. The forefront sheet 32D is constituted by a polarized reflection sheet, for example. The diffusion plate group 32K need not use the polarized reflection sheet, and in this case, a plurality of optical sheets are disposed, and the forefront sheet 32D is the sheet located at the very front. The forefront sheet 32D is constituted by a plane portion 32Da and a bent portion 32Db which is a bent portion in the upper area of the plane portion 32Da.

As illustrated in FIG. 11A, the forefront sheet 32D, out of the optical sheet 32S, can press the other constituents of the diffusion plate group 32K using the plane portion 32Da. In the lower area of the case 3C, a flange portion 3Ca and a step portion 3Cb connected to the flange portion 3Ca are formed. A part of the optical sheet 32S (e.g. diffusion plate group 32K located on the rear surface side from the forefront sheet 32D) is also disposed on the step portion 3Cb, and the lower end thereof is supported by the step portion 3Cb.

The lower end of the forefront sheet 32D is fixed to the flange portion 3Ca of the case 3C by screwing (not illustrated), whereby falling of the optical sheet 32S is prevented. The method of fixing the lower end of the forefront sheet 32D to the flange portion 3Ca is not limited to screwing.

According to the structure of Example 2, the optical sheet can be supported by directly fixing the forefront sheet 32D of the optical sheet 32S to the case of the backlight, hence the sheet holder to support the optical sheet, described in Example 1, can be omitted. As a result, the structure can be further simplified and cost of the image display apparatus can be reduced.

Example 3

Example 3 of the present invention will now be described.

Figure 12:
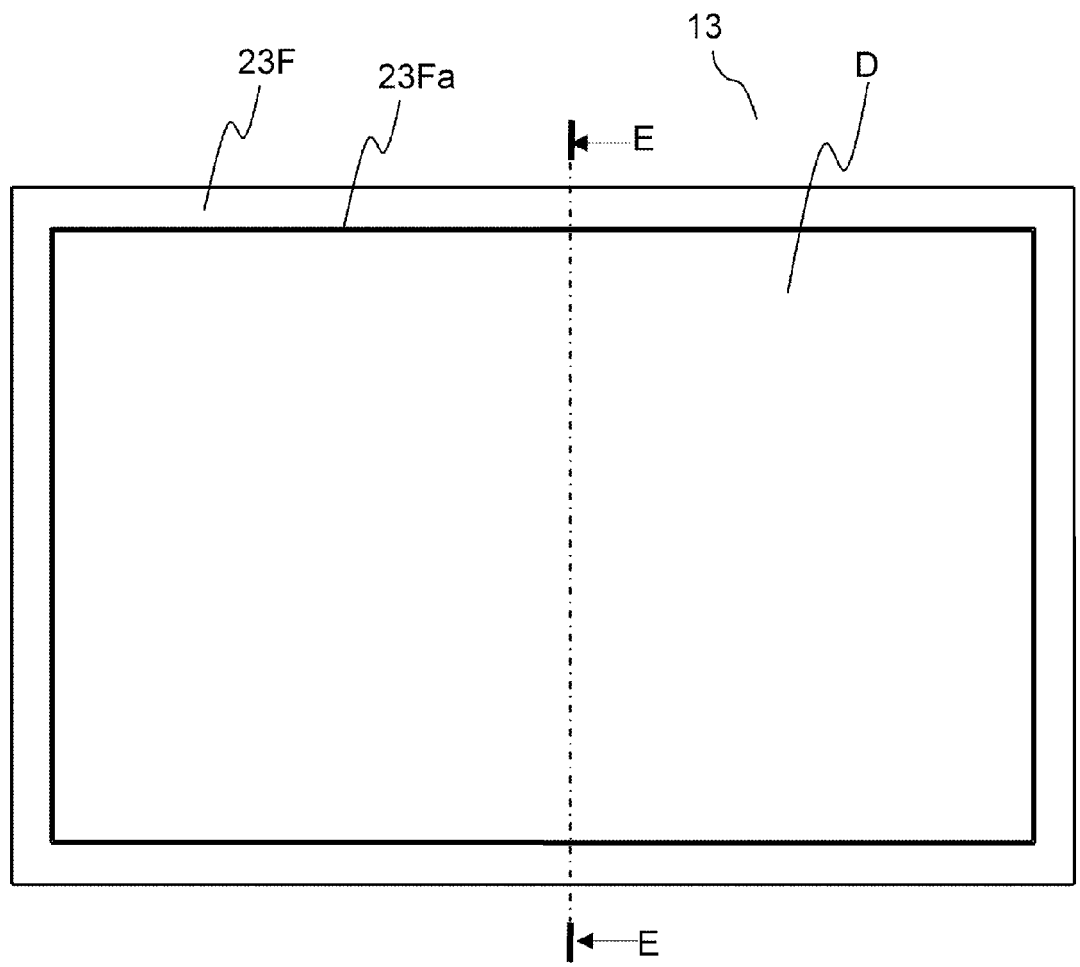
FIG. 12 is a front view of an image display apparatus of Example 3.
Figure 13:
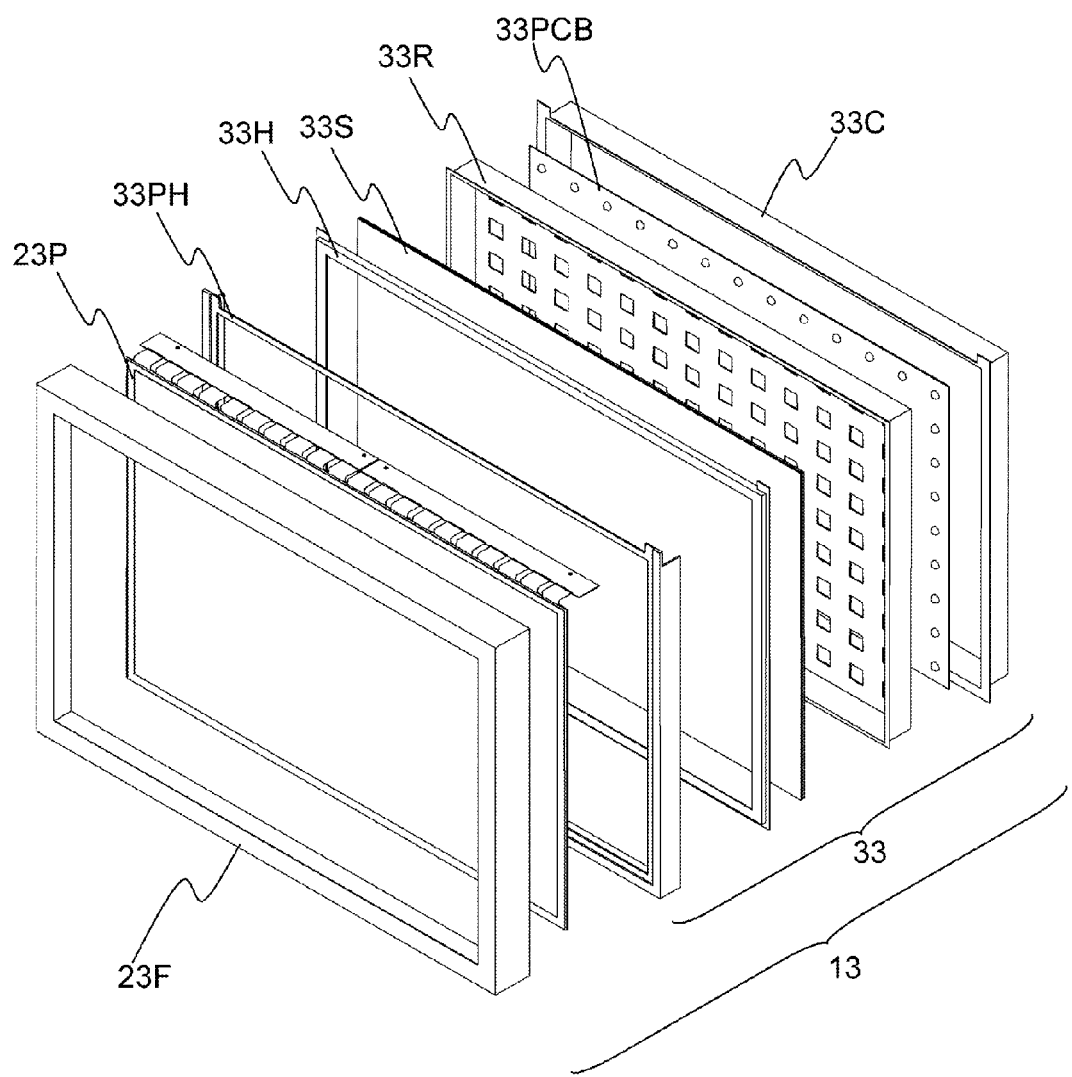
FIG. 13 is an exploded perspective view of the image display apparatus of Example 3.
Figure 14:
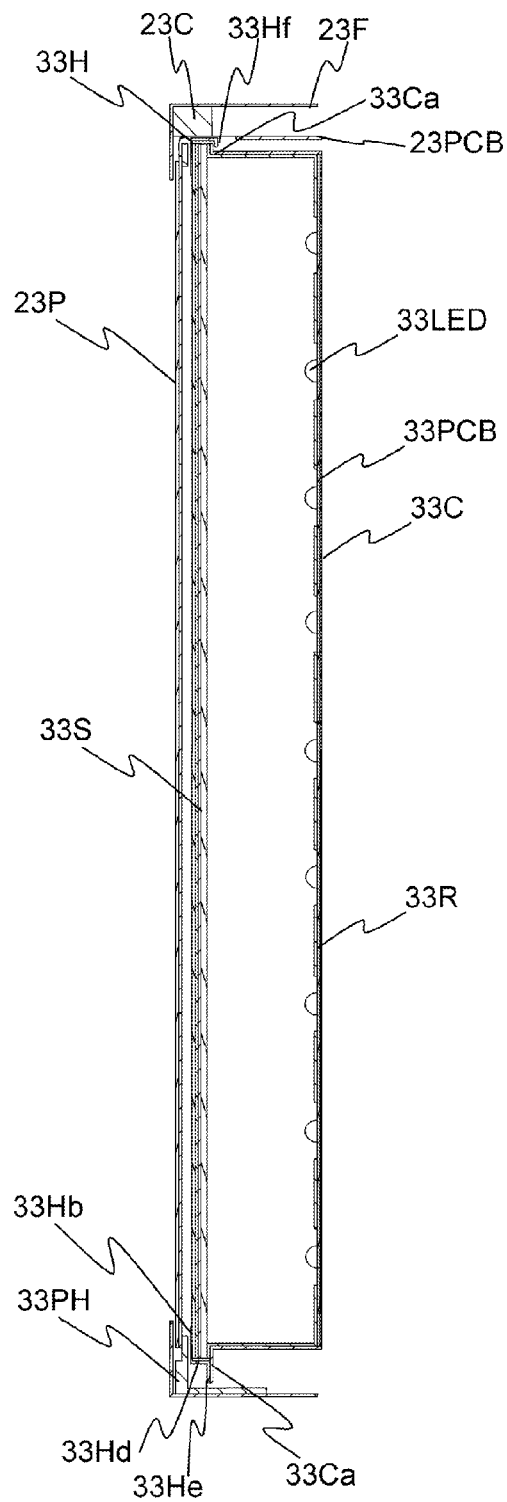
FIG. 14 is a cross-sectional view of the image display apparatus of Example 3.

FIG. 12 is a front view of the image display apparatus of Example 3 of the present invention. FIG. 13 is an exploded perspective view of the image display apparatus of Example 3 of the present invention. FIG. 14 is a cross-sectional view sectioned at E-E in FIG. 12.

Unlike Example 1 and Example 2, the image display apparatus 13 of Example 3 has a structure where the display panel is not bonded to the front plate. A frame 23F is disposed on the front surface of a display panel 23P, and an opening 23Fa exists approximately at the center of the frame 23F. An image display area D is located approximately at the center of the image display apparatus 13.

The component configuration of the image display apparatus 13 will be described with reference to FIG. 13. In the image display apparatus 13, the display panel 23P and the frame 23F, to press the display panel 23P, are displayed on the front surface of the backlight unit 33. A panel holder 33PH, which supports the display panel 23P from the rear surface, is disposed on the backlight unit 33, and a sheet holder 33H is disposed on the rear surface side of the panel holder 33PH. An optical sheet 33S is disposed on the rear surface side of the sheet holder 33H. Just like Example 1, the sheet holder 33H is disposed on the front surface side of the optical sheet 33S, therefore falling of the optical sheet 33S is prevented. A reflection sheet 33R and a light source board 33PCB are disposed on the rear surface side of the optical sheet 33S. A case 33C is disposed so as to house the reflection sheet 33R and the light source board 33PCB.

The configuration of the image display apparatus of Example 3 will be described with reference to FIG. 14. The weight of the optical sheet 33S is supported by the step portion 33Hd located in the lower area of the sheet holder 33H disposed on the front surface side of the optical sheet 33S. Falling of the optical sheet 33S toward the front surface side is prevented by the plane portion 33Hb facing the front surface of the optical sheet 33S. The flange portion 33He of the sheet holder 33H and the flange portion 33Ca of the case 33C face each other, and the sheet holder 33H is fixed to the case 33C in this portion by screwing (not illustrated).

In the upper area of the sheet holder 33H, the latch portion 33Hf, which extends from the front surface side to the rear surface side and is then bent, is latched to the flange portion 33Ca of the case 33C, whereby the sheet holder 33H is fixed to the case 33.

As described above, according to Example 3, the structure using the sheet holder can be used even for an image display apparatus of which display panel is not bonded to the front plate. By using this structure, the panel holder to support the display panel and the sheet holder to support the optical sheet can be separate members, and the respective component shapes can be simplified, and as a result, cost for creating the components can be reduced.

Example 4

Figure 15:
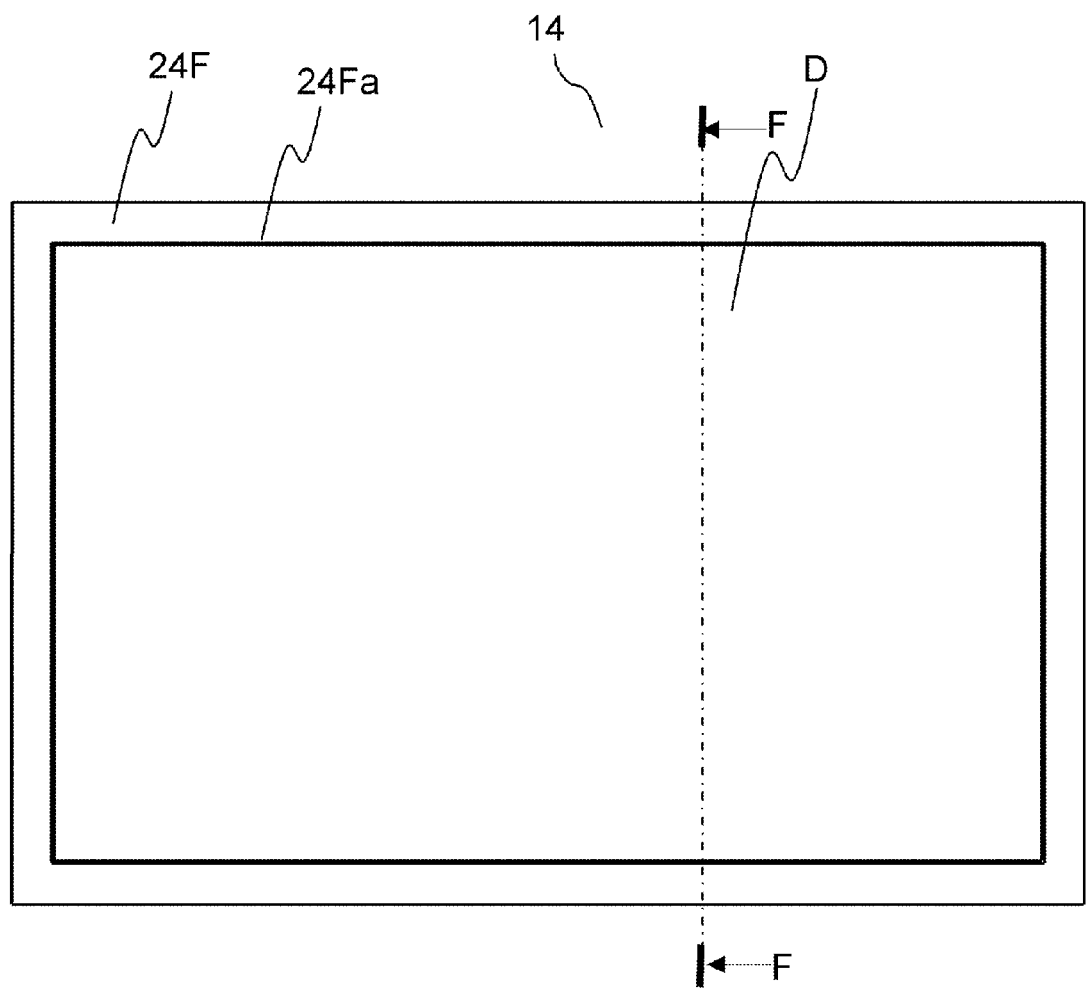
FIG. 15 is a front view of an image display apparatus of Example 4.
Figure 16:
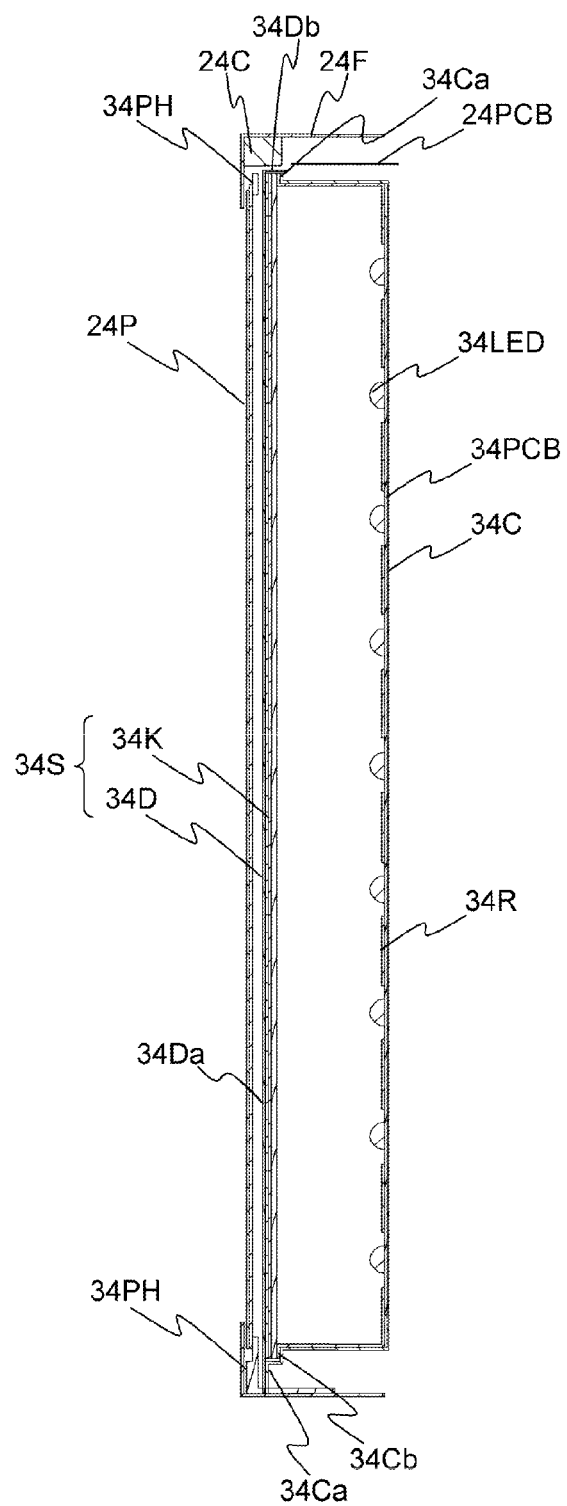
FIG. 16 is a cross-sectional view of the image display apparatus of Example 4.
Figure 17:
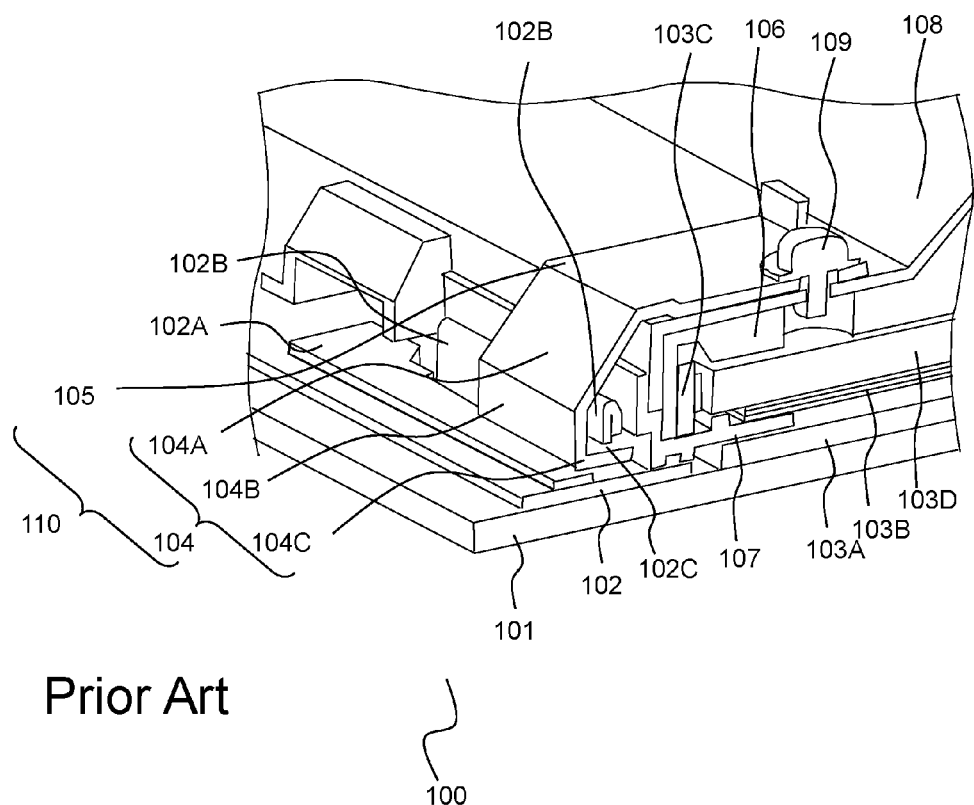
FIG. 17 is a cross-sectional view depicting a key section of the structure of a conventional image display apparatus.

Example 4 of the present invention will now be described. FIG. 15 is a front view of an image display apparatus of Example 4 of the present invention. FIG. 16 is a cross-sectional view sectioned at F-F in FIG. 15.

Unlike Example 1 and Example 2, and just like Example 3, the image display apparatus 14 of Example 4 has a structure where the display panel is not bonded to the front plate. A frame 24F is disposed on the front surface of a display panel 24P, and an opening 24Fa exists approximately at the center of the frame 24F. An image display area D is located approximately at the center of the image display apparatus 14.

The configuration of Example 4 will be described with reference to FIG. 16. An optical sheet 34S is disposed on the rear surface side of a panel holder 34PH, which supports the display panel 24P from the rear surface side. The optical sheet 34S is constituted by a diffusion sheet group 34K and a forefront sheet 34D. The diffusion sheet group 34K is constituted by a diffusion plate and a diffusion sheet to diffuse light emitted from a light source 34LED mounted on a light source board 34PCB, and a lens sheet to collect lights. Normally a polarized reflection sheet is used for the forefront sheet 34D, whereby brightness of the light is increased. The configuration of the optical sheet 34S, however, is not limited to this example.

The lower area of the diffusion sheet group 34K is housed in a step portion 34Cb formed in the lower area of the case 34C, and the weight of the diffusion sheet group 34K is supported by the step portion 34Cb. The plane portion 34Da of the forefront sheet 34D and the flange portion 34Ca of the case 34C face each other, and are fixed by screwing (not illustrated) or the like. Falling of the diffusion sheet group 34K toward the front surface side is prevented by the forefront sheet 34D. A bent portion 34Db, which is bent from the plane portion 34Da toward the rear surface side, exists in the upper area of the forefront sheet 34D, and the bent portion 34Db latches with the flange portion 34Ca of the case 34C, so that the optical sheet 34S is fixed.

As described above, according to Example 4, the forefront sheet 34D of the optical sheet 34 has the above mentioned shape, whereby the optical sheet can be supported without using the panel holder that supports the display panel. As a result, the structure for the panel holder to support the optical sheet becomes unnecessary, the shapes of the components can be simplified, and cost of components can be reduced.

As described in each example, the present invention includes a sheet holder to support the optical sheet separately from the member to support the display panel. Or the shape of the forefront sheet of the optical sheet has a shape that allows latching with the case. Thereby the image display apparatus can be configured without using a member having a complicated structure to play both roles of supporting the display panel and the optical sheet, and as a result, composing elements can be simplified, and cost can be reduced.

In the above mentioned examples, the present invention is applied to an image display apparatus having a direct backlight of which light source is located directly under the display panel, but the present invention can also be applied to an image display apparatus having an edge light type backlight of which light source is located on the outer periphery of the display area of the display panel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-119847, filed on Jun. 10, 2014, which is hereby incorporated by reference herein in its entirety.

What is claimed is:

1. An image display apparatus, comprising:
   a display panel;
   a light emitting unit that emits light to be irradiated onto the display panel;
   an optical sheet that is disposed between the light emitting unit and the display panel;
   a supporting unit that supports the display panel from a front surface side of the display panel; and
   a sheet holder that supports the optical sheet from a front surface side of the optical sheet, wherein
   the sheet holder has an opening at a center, and includes:
   a plane portion that supports the optical sheet from front surface side;
   a step portion that extends from the plane portion to a rear surface side of the plane portion;
   a first flange portion that extends from the step portion to an outer periphery side of the plane portion; and
   a structure that is disposed in the plane portion and that bends from the plane portion toward the rear surface side so as to fix the optical sheet to a case that houses the light emitting unit.

2. The image display apparatus according to claim 1, wherein the supporting unit includes:
a transparent front plate that is fixed onto a display surface of the display panel; and
a frame that holds the front plate from a rear surface side, and
the display panel fixed onto the front plate held by the front plate that is held by the frame.

3. The image display apparatus according to claim 1, wherein
the supporting unit is a panel holder that holds the display panel.

4. The image display apparatus according to claim 1, wherein
The first flange portion of the sheet holder is fixed on a second flange portion of the case that houses the light emitting unit.

5. The image display apparatus according to claim 1, wherein
the sheet holder supports the weight of the optical sheet at the step portion.

6. The image display apparatus according to claim 1, wherein
the light emitting unit has a light source located directly under the display panel.

7. The image display apparatus according to claim 1, wherein the sheet holder has a sheet-like shape.

\* \* \* \* \*